Sept. 27, 1927.
S. KIRSCHBERG
BEDSPRING FABRIC
Filed Dec. 23, 1925
1,643,623
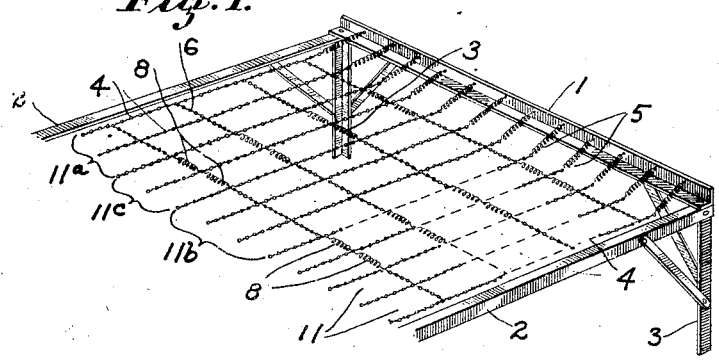
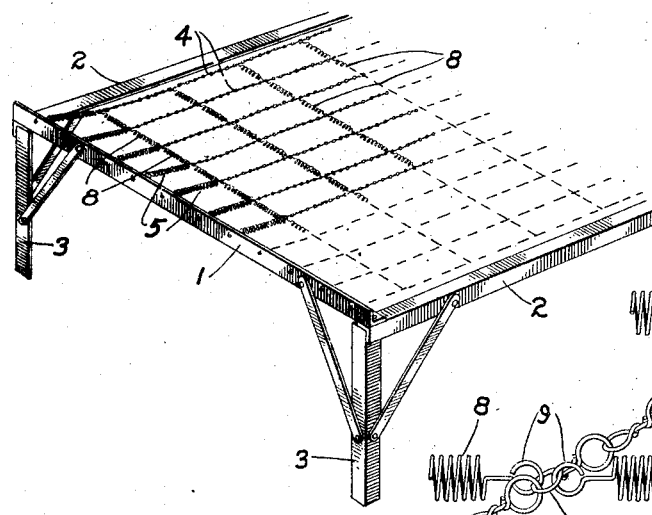
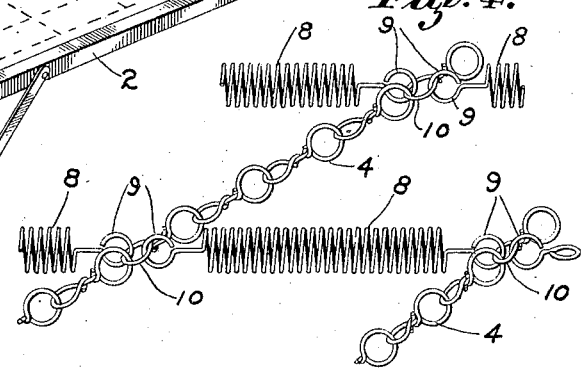
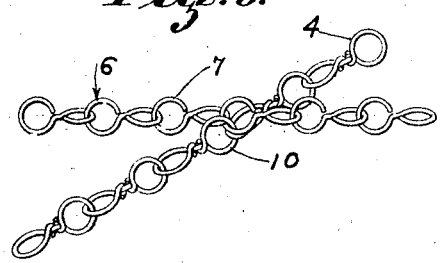
INVENTOR.
Sigmund Kirschberg
BY
Dewey, Strong, Townsend & Lofton
ATTORNEYS.

Patented Sept. 27, 1927.

1,643,623

UNITED STATES PATENT OFFICE.

SIGMUND KIRSCHBERG, OF SAN FRANCISCO, CALIFORNIA.

BEDSPRING FABRIC.

Application filed December 23, 1925. Serial No. 77,245.

This invention relates to bed-spring fabrics. Such fabrics have heretofore been made of woven wire and chains and springs of various kinds. Many of these have been of rather a complicated and complex character and very expensive to manufacture. It is the primary object of my invention to provide an improved bed-spring fabric which can be very cheaply manufactured and which is constructed in a manner providing advantages heretofore unknown in fabrics of this type.

In the accompanying drawing I have illustrated certain specific embodiments of my invention, but it will be understood that the invention can be otherwise embodied and that the drawing is not to be construed as defining or limiting the scope of the invention, the claims appended to this specification being relied upon for that purpose.

Referring to the figures of the drawing:

Fig. 1 is a fragmentary perspective view of one form of my invention,

Fig. 2 is a fragmentary perspective view of another form thereof;

Fig. 3 is an enlarged fragmentary view of the fabric shown in Fig. 1, and

Fig. 4 is a perspective view of another portion thereof.

In the drawing, 1 indicates the end bar, 2 the side rails, and 3 the legs of a bed. The bed-spring fabric mounted thereon comprises a plurality of relatively spaced chains 4 extending longitudinally of the bed and connected to the end bars by helical springs 5. These chains 4 can be "Brown" chains such as illustrated in Fig. 3, or any desired form of chain.

The cross-chain members 6 comprise "jack" chains 7 in linked connection with the longitudinal chains 4 at the intersections thereof, and helical springs 8 intermediate certain portions of the jack chains and connected to the longitudinal chains at the intersections therewith. It will be noted that the jack chain portions and helical spring portions may be placed alternately in the cross-chain members 6 and connected to the longitudinal chains at the intersections therewith. It will furthermore be noted that the helical springs are of such a length as to span a space between two adjacent longitudinal chains 4 and the ends thereof are formed into eyes 9 adapted to be freely opened and connected to the longitudinal chains.

Chains whose links are formed with eyes at the opposite ends thereof adapted to be freely opened, as the chain 6, are commonly called "jack chains", and chains formed with the ends of the links bent around the shank portions thereof, as the chains 4, are commonly called "Brown chains". These terms as used throughout this specification are intended to have these meanings.

It will be noted that the jack chains are formed with eyes similar to the eyes 9 of the springs, which can be freely opened and connected to the chains 4. In assembling the fabric, the longitudinal chains 4 are first connected to the end bars 1. The jack chains and helical springs are then strung across and connected to the longitudinal chains merely by opening up the eyes of the jack chains and springs and hooking them into the intersecting links of the chains 4. It will be obvious that this is a very simple operation and provides a very substantial and cheap construction. As illustrated in Figs. 3 and 4, both the jack chains and springs are connected to the intersecting links 10 of the chains 4 in a manner forming a complete and continuous fabric.

It will be understood that the jack chains and springs can be arranged in any manner which seems best. After considerable experimenting, I have found that the arrangement shown in Fig. 1 is most satisfactory. In this construction as illustrated, there are provided twelve longitudinal chains 4 which provide eleven spaces 11 therebetween. I span the outside two spaces 11$^a$ at each side and the three middle spaces 11$^b$ with jack chains and the two spaces 11$^c$ therebetween at each side of the middle with spiral springs. Such construction gives a resiliency to the fabric without permitting an undesirable sagging thereof. The location of the jack chains at the center prevents sagging thereof, and the location of the jack chains at the sides prevents the occupant rolling off the bed due to sagging of the sides thereof.

While I preferably form the cross-chain members of the jack chain and helical spring combination above defined, I may of course make the same of other combinations which seem desirable. In Fig. 2, I have illustrated the cross-chain members as comprised entirely of helical springs 8. Such a construction is very resilient and comfortable, but of course more expensive than when jack chains are used. The helical springs used in this form of the invention are the same as those above described and are connected to the longitudinal chains 4 in the same manner.

Having thus described my invention, what I claim is:

1. A bed-spring fabric comprising a plurality of relatively spaced chains extending longitudinally of the bed, a plurality of relatively spaced laterally extending jack chains in linked connection with the longitudinal chains at the intersection therewith, and helical springs connecting portions of the jack chains and connected to the longitudinal chains at the intersections therewith.

2. A bed-spring fabric comprising a plurality of relatively spaced chains extending longitudinally of the bed, and a plurality of relatively spaced laterally extending chain members comprising alternate portions of jack chains and helical springs connected to each other and to the longitudinal chains at the intersections therewith.

3. A bed-spring fabric comprising a plurality of relatively spaced chains extending longitudinally of the bed, and a plurality of relatively spaced laterally extending chain members comprising jack chains connected to certain of the longitudinal chains and spanning the spaces between such chains, and helical springs connected to certain of the longitudinal chains and spanning the remaining spaces between the longitudinal chains.

4. A bed-spring fabric comprising a plurality of relatively spaced chains extending longitudinally of the bed, and a plurality of relatively spaced laterally extending chain members comprising jack chains connected to certain of the longitudinal chains and spanning the spaces between such chains adjacent the edges of the fabric and at the center thereof, and helical springs connected to certain of the longitudinal chains and spanning the remaining spaces between the longitudinal chains at each side of the center thereof.

SIGMUND KIRSCHBERG.